United States Patent
Wang

(10) Patent No.: US 12,188,502 B2
(45) Date of Patent: Jan. 7, 2025

(54) ONE PIECE STAPLE STRIP

(71) Applicant: APEX MFG. CO., LTD., Taichung (TW)

(72) Inventor: Jing-Li Wang, Taichung (TW)

(73) Assignee: APEX MFG. CO., LTD., Taichung (TW)

(*) Notice: Subject to any disclaimer, the term of this patent is extended or adjusted under 35 U.S.C. 154(b) by 312 days.

(21) Appl. No.: 17/673,316

(22) Filed: Feb. 16, 2022

(65) Prior Publication Data
US 2023/0258214 A1   Aug. 17, 2023

(51) Int. Cl.
 F16B 15/08   (2006.01)
 F16B 15/00   (2006.01)

(52) U.S. Cl.
 CPC .......... F16B 15/08 (2013.01); F16B 15/0015 (2013.01)

(58) Field of Classification Search
 CPC ...... F16B 15/08; F16B 15/0015; F16B 15/02; F16L 3/04
 USPC ................. 411/443, 920, 473, 474, 475, 921
 See application file for complete search history.

(56) References Cited

U.S. PATENT DOCUMENTS

| | | | | |
|---|---|---|---|---|
| 463,830 A * | 11/1891 | Gibson | ................... | F16B 5/125 52/220.1 |
| 780,019 A * | 1/1905 | Arendt | ..................... | B65D 9/32 217/70 |
| 839,836 A * | 1/1907 | Greenfield | .............. | F16B 15/08 411/444 |
| 1,465,783 A * | 8/1923 | Polzer | ..................... | F16B 15/08 24/703.5 |
| 4,755,091 A * | 7/1988 | Potucek | .................. | F16B 15/00 411/452 |
| 5,223,675 A * | 6/1993 | Taft | ......................... | H02G 3/26 174/164 |
| 5,350,267 A * | 9/1994 | Mangone, Jr. | ........ | F16L 3/1207 411/457 |
| 5,620,289 A * | 4/1997 | Curry | .................. | F16B 15/0015 411/444 |
| 6,530,803 B1 * | 3/2003 | Chen | .................. | H01R 13/5837 439/465 |
| 6,582,173 B1 * | 6/2003 | Miller | ..................... | F16B 15/08 411/443 |

(Continued)

FOREIGN PATENT DOCUMENTS

| | | | | |
|---|---|---|---|---|
| DE | 102009009400 A1 * | 8/2010 | .......... | F16B 15/0015 |
| DE | 202013000852 U1 * | 2/2013 | ................ | F16L 3/04 |

(Continued)

*Primary Examiner* — Eugene G Byrd
*Assistant Examiner* — Jock Wong
(74) *Attorney, Agent, or Firm* — MUNCY, GEISSLER, OLDS & LOWE, P.C.

(57) ABSTRACT

A one piece staple strip is provided, including: a plurality of staples, each of the plurality of staples including two leg portions and a crown portion connected with and between the two leg portions; a connection portion, connected with and between every neighboring two staples of the plurality of staples; and a stop portion, projecting laterally from the leg portion of each of the plurality of staples and defining a holding space with the crown portion of each of the plurality of staples, the holding space being configured to receive a cable; wherein each of the two leg portions of each of the plurality of staples includes a spike section extending from the stop portion.

9 Claims, 6 Drawing Sheets

(56) References Cited

U.S. PATENT DOCUMENTS

| | | | |
|---|---|---|---|
| 7,546,988 B1 * | 6/2009 | Schecter | H02G 3/32 |
| | | | 248/65 |
| 2006/0198718 A1 * | 9/2006 | Chen | F16B 15/06 |
| | | | 411/475 |
| 2018/0172052 A1 * | 6/2018 | Gray | F16L 3/04 |
| 2019/0101147 A1 * | 4/2019 | Fairbanks | F16B 15/08 |
| 2021/0372451 A1 * | 12/2021 | Nettleton | F16B 15/08 |

FOREIGN PATENT DOCUMENTS

| | | | | |
|---|---|---|---|---|
| EP | 2759719 A1 * | 7/2014 | | F16L 3/04 |
| EP | 3470742 A1 * | 4/2019 | | |
| FR | 369246 A * | 1/1907 | | |
| GB | 1554602 A * | 10/1979 | | F16B 15/0015 |
| KR | 20090084481 A * | 8/2009 | | |
| KR | 20090010816 U * | 10/2009 | | |
| KR | 102349115 B1 * | 1/2022 | | |
| WO | WO-03038291 A1 * | 5/2003 | | F16B 15/0015 |
| WO | WO-2004099633 A1 * | 11/2004 | | F16B 15/0015 |

\* cited by examiner

ONE PIECE STAPLE STRIP

BACKGROUND OF THE INVENTION

Field of the Invention

The present invention relates to a one piece staple strip.

Description of the Prior Art

In many fields, there is often a need to arrange cables according to different environments or operational needs, wherein the cables may be electrical cables or non-electrical cables. Specifically, the requirement of arranging conductive cables in order to build a circuit is more common.

The cable is usually fixed on a mounting base (such as wood or cement base). Since the cable is very long and flexible, it is not easy to make it straight and positioned. Therefore, a stapler with staples (such as U-shaped staples) is commonly used to fix the cable. However, there is none of effective connection structure between the adjacent U-shaped staples of a conventional staple strip, which causes the arrangement of the U-shaped staples to be dislocated and not straight. Furthermore, the conventional staple strip is not provided with a guiding structure which is configured to match with the cartridge of a stapler, so that the stapling effect is worse, it is easy to jam, and it is easy to damage the cable.

A conventional cable fixing method is carried out by passing a U-shaped metal staple through a plastic member having a holding notch. The conventional cable fixing device is not formed of one piece, which is difficult to manufacture and expensive, and the metal staple is easy to cause damage to the cable, leakage of electricity and short circuit.

The present invention is, therefore, arisen to obviate or at least mitigate the above-mentioned disadvantages.

SUMMARY OF THE INVENTION

The main object of the present invention is to provide a one piece staple strip which is straight and good in holding a cable.

To achieve the above and other objects, a one piece staple strip is provided, including: a plurality of staples, each of the plurality of staples including two leg portions and a crown portion connected with and between the two leg portions; a connection portion, connected with and between every neighboring two staples of the plurality of staples; and a stop portion, projecting laterally from the leg portion of each of the plurality of staples and defining a holding space with the crown portion of each of the plurality of staples, the holding space being configured to receive a cable; wherein each of the two leg portions of each of the plurality of staples includes a spike section extending from the stop portion.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
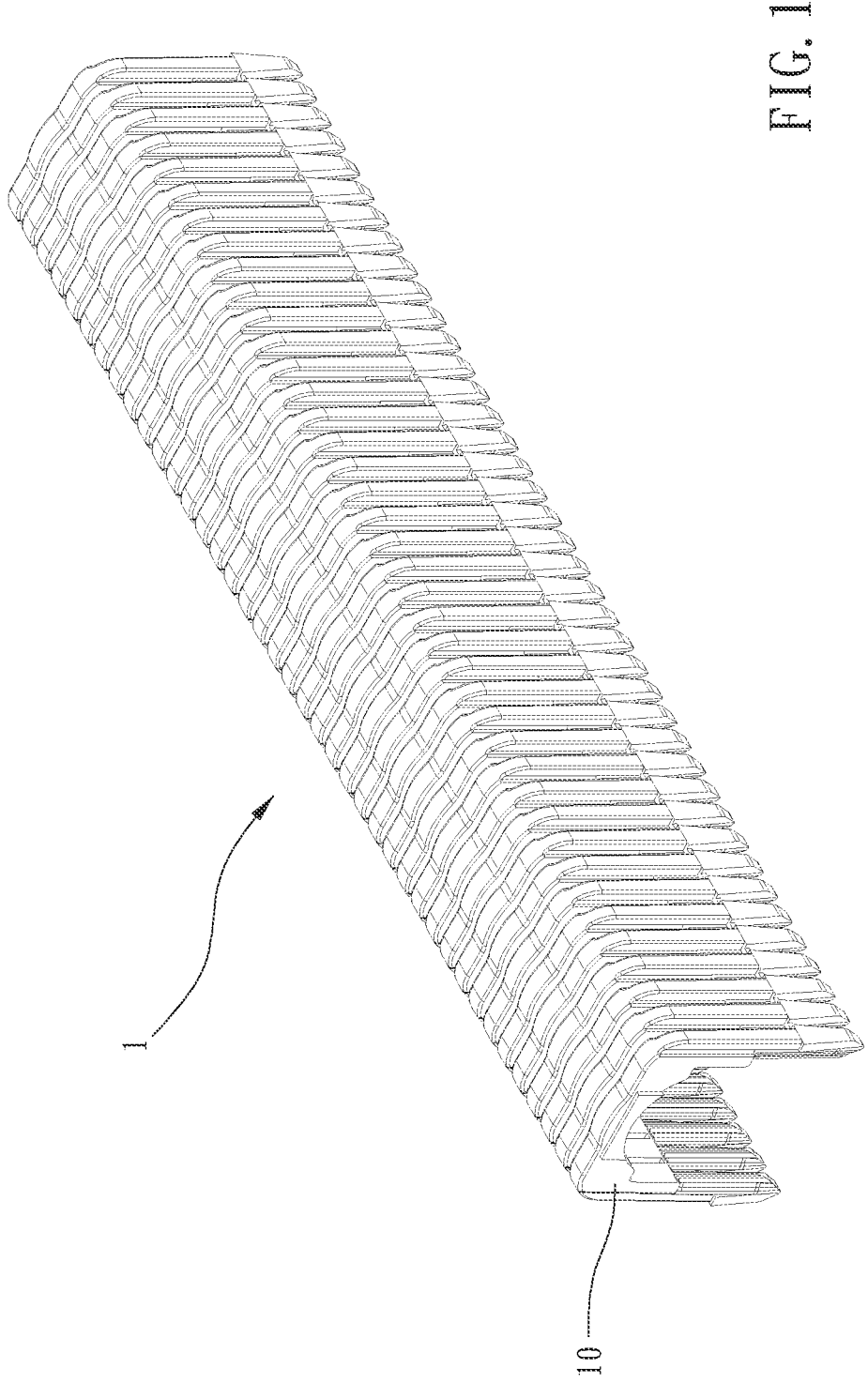
FIG. 1 is a stereogram of a preferable embodiment of the present invention.
Figure 2:
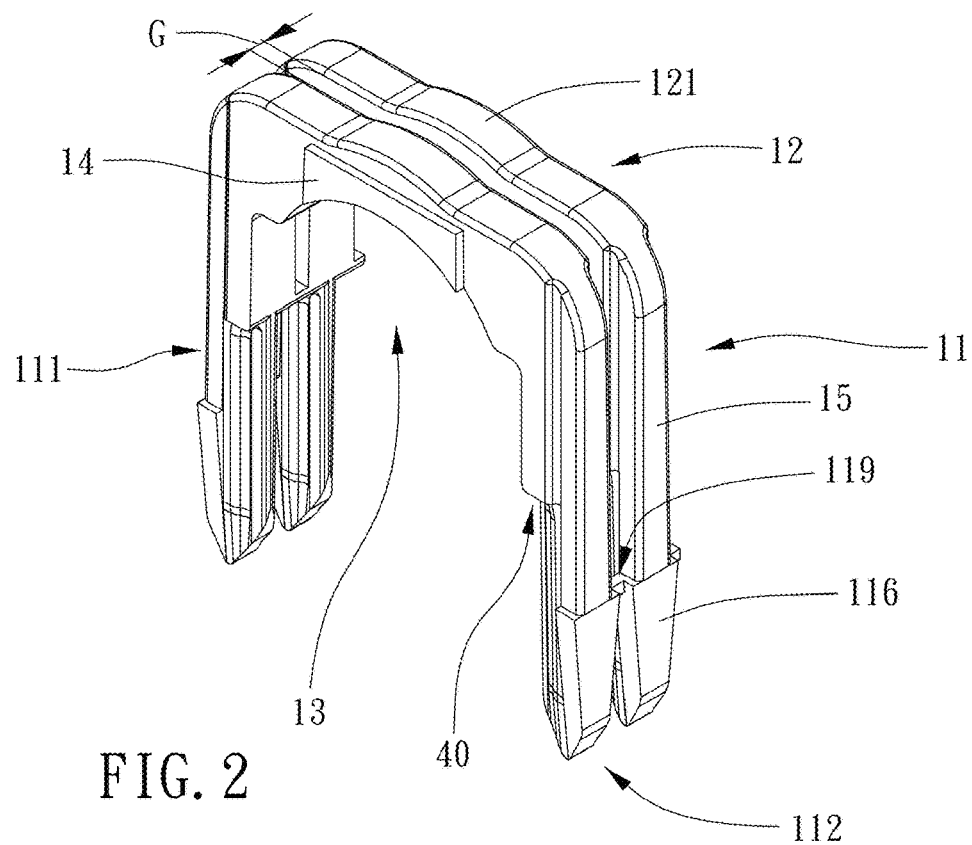
FIGS. 2 and 3 are partial stereograms of different view angles according to a preferable embodiment of the present invention.
Figure 3:
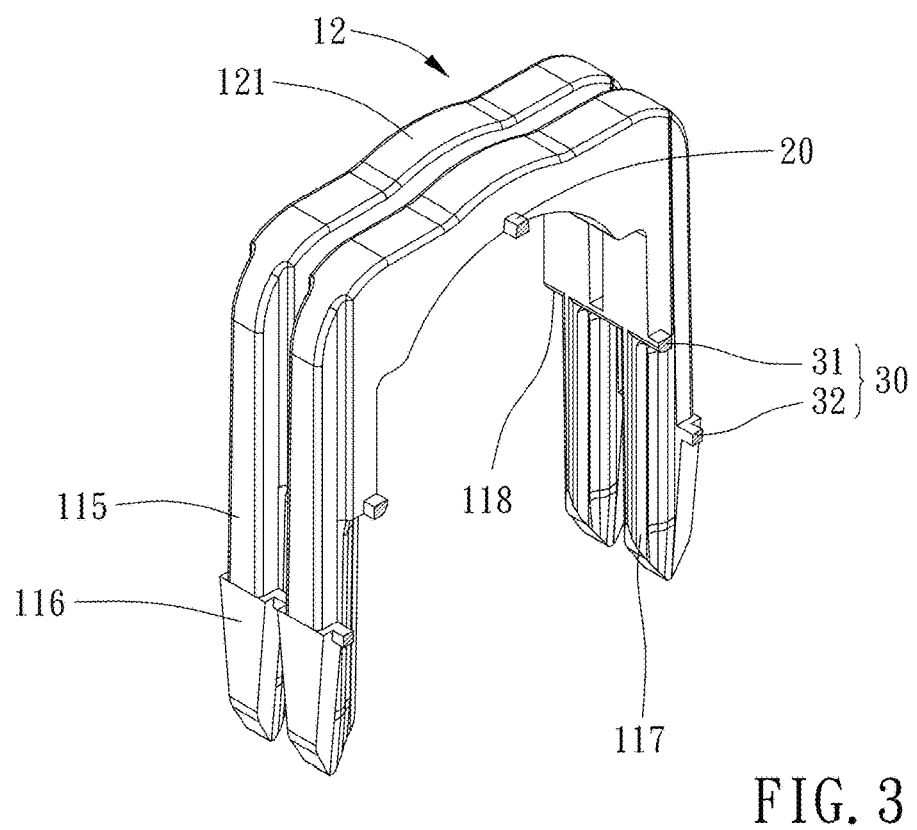
Figure 4:
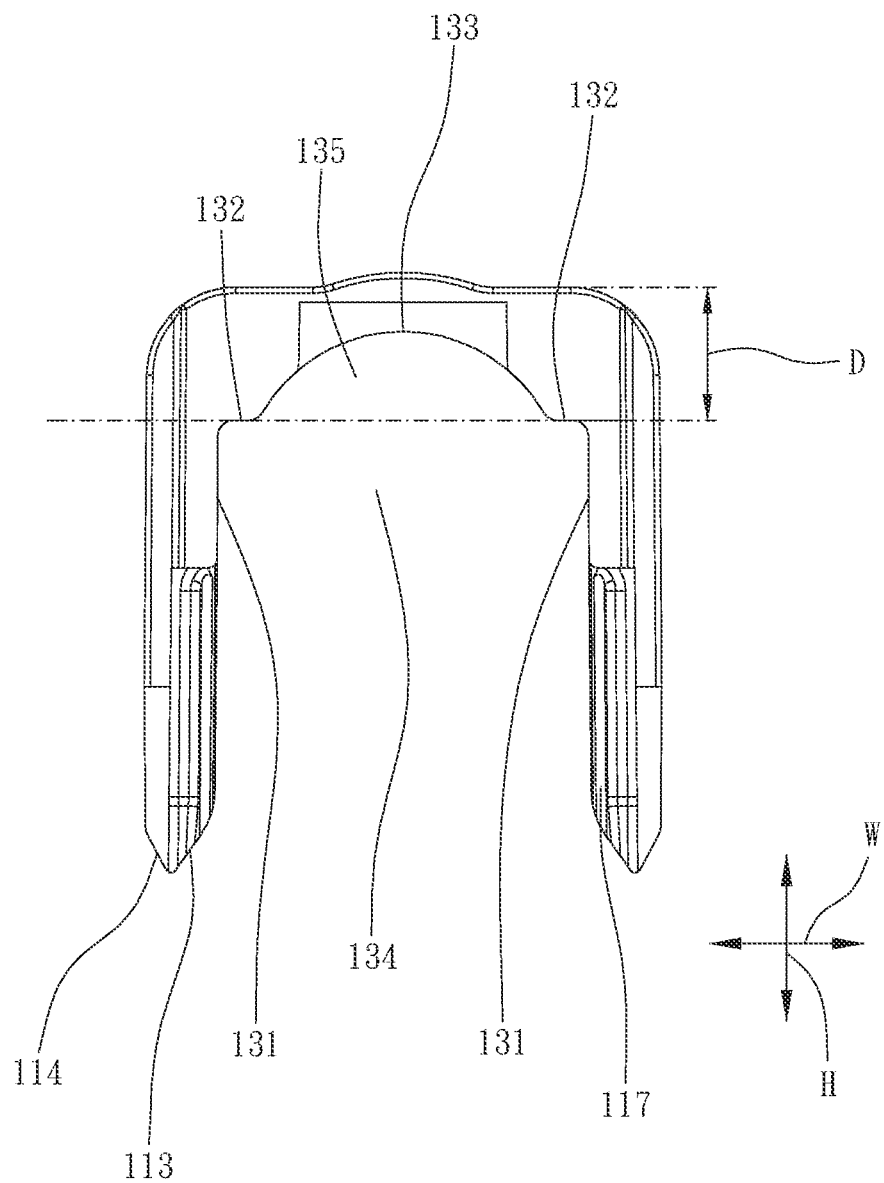
FIG. 4 is a side view of a preferable embodiment of the present invention.
Figure 5:
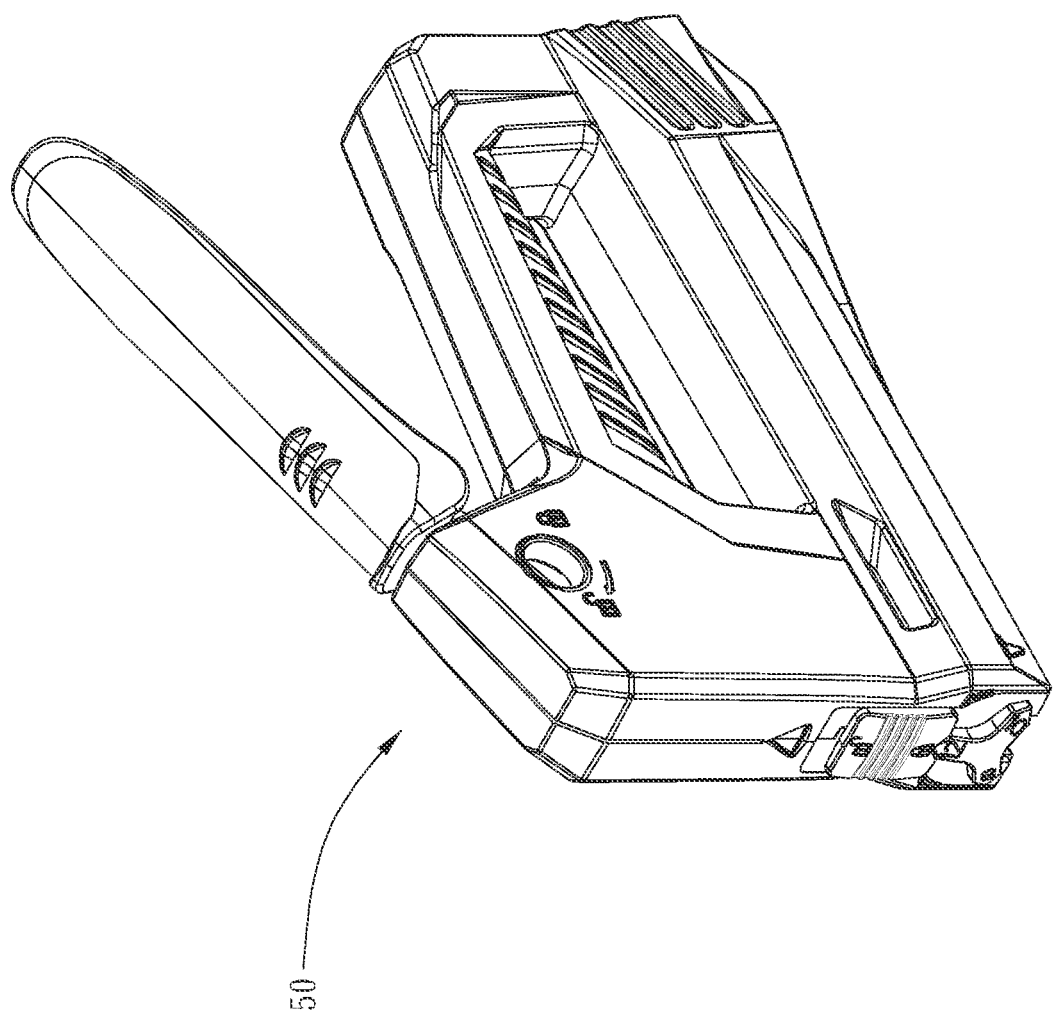
FIG. 5 is a stereogram of a stapler of a preferable embodiment of the present invention.
Figure 6:
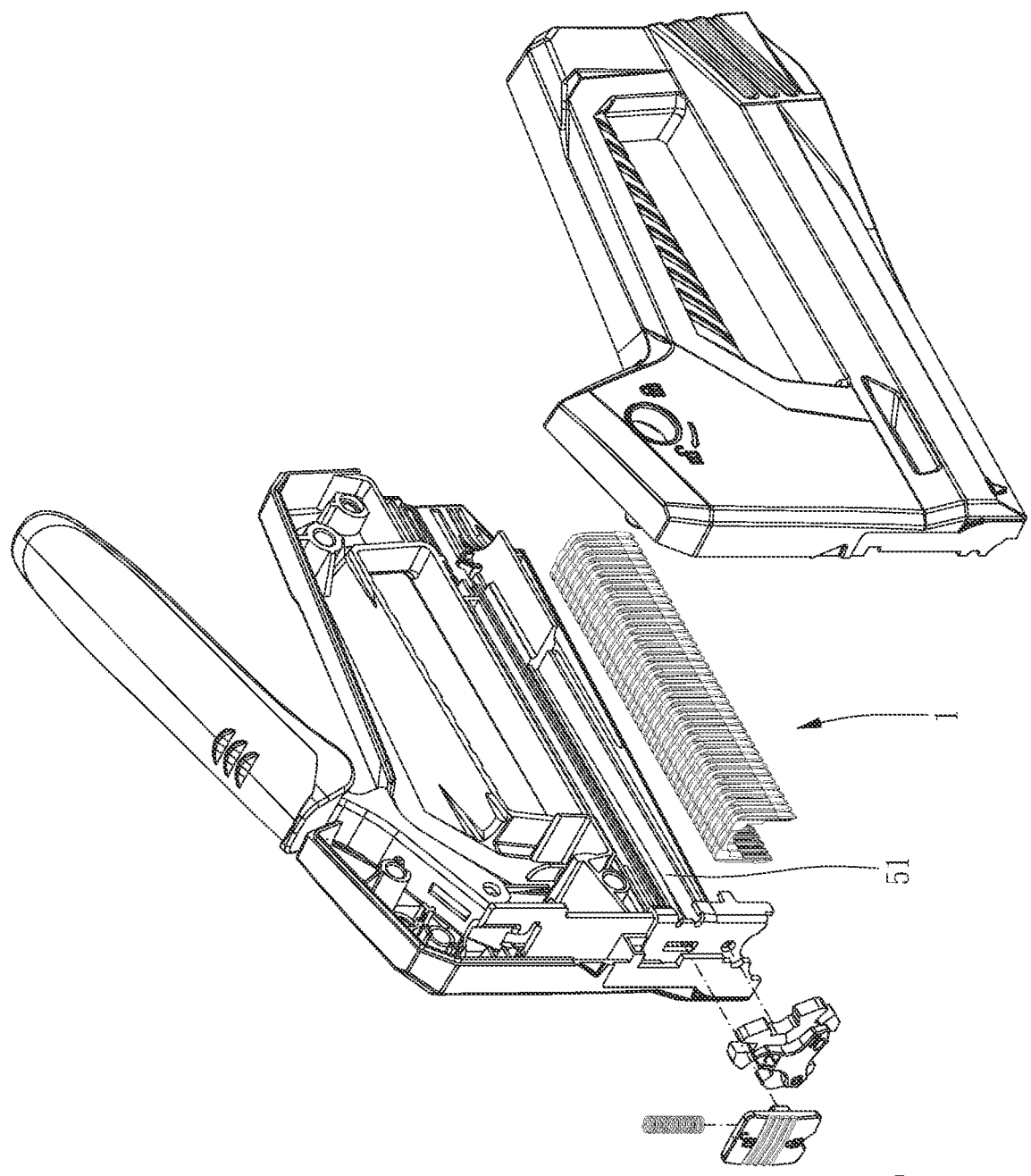
FIG. 6 is a breakdown drawing of FIG. 5.
Figure 7:
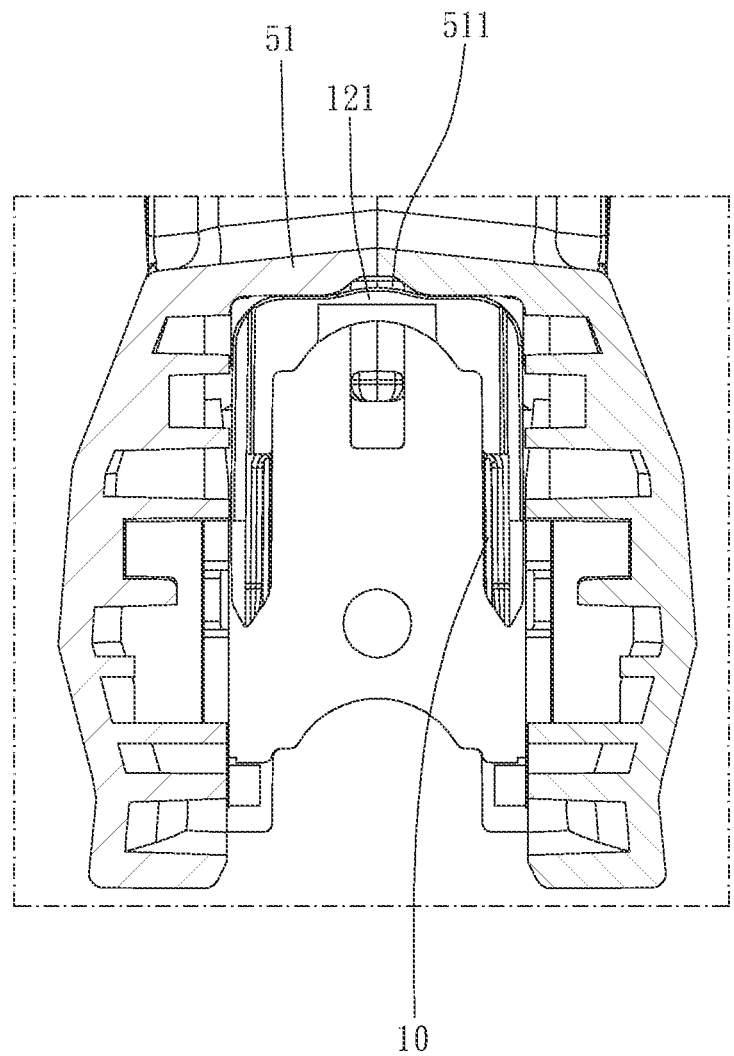
FIG. 7 is a partial enlarged cross-sectional view of FIG. 5.

Please refer to FIGS. 1 to 7 for a preferable embodiment of the present invention. A one piece staple strip 1 of the present invention includes a plurality of staples 10, a connection portion and a stop portion 40. The one piece staple strip 1 may be made of a material such as plastic, metal or any material having sufficient structural strength.

Each of the plurality of staples 10 includes two leg portions 11 and a crown portion 12 connected with and between the two leg portions 11. The connection portion is connected with and between every neighboring two staples of the plurality of staples 10. The stop portion 40 projects laterally from the leg portion 11 of each of the plurality of staples 10 and defines a holding space 13 with the crown portion 12 of each of the plurality of staples 10, and the holding space 13 is configured to receive a cable. Each of the two leg portions 11 of each of the plurality of staples 10 includes a spike section 111 extending from the stop portion 40. Whereby, it ensures that the one piece staple strip 1 extends straightly and holds the cable appropriately. The staple 10 may be shaped in U-shape or any configuration having a holding space.

The connection portion includes at least one of a first connection portion 20 and a second connection portion 30 (preferably both), the first connection portion 20 is connected with and between the crown portions 12 of neighboring two staples of the plurality of staples 10, and the second connection portion 30 is connected with and between the leg portions 11 of neighboring two staples of the plurality of staples 10. In this embodiment, the holding space 13 includes two straight sides 131 opposite to each other, two shoulders 132, and a concave side 133. The two shoulders 132 are connected laterally to the two straight sides 131, respectively. The concave side 133 is connected to an end of one of the two shoulders 132 and an end of the other of the two shoulders 132. An extending line of the two shoulders 132 divides the holding space 13 into a rectangular region 134 and a segment region 135. The rectangular region 134 is configured to be applied to a cable which is rectangular or flat, and the segment region 135 is configured to be applied to a cable which is circular.

The crown portion 12 of each of the plurality of staples 10 includes a projection 121 at a top side thereof. The projection 121 is configured to cooperate with a groove 511 on an inner surface of a cartridge 51 of a stapler 50. The projection 121 serves as a mechanism for stabilization and positioning of staples of different sizes within the groove 511 so that each of the plurality of staples 10 can be well stabilized and positioned. The spike section 111 of each of the plurality of staples 10 includes a tapered end 112 which is a free end, and the tapered end 112 includes an inner inclined face 113 and an outer inclined face 114. An extent of the outer inclined face 114 is smaller than an extent of the inner inclined face 113 so that the staple 10 can come into a mounting base (such as wood or cement base). Preferably, the spike section 111 of each of the plurality of staples 10 includes a body section 115 extending from the stop portion 40 and an enlarged head 116 connected to the body section 115. The enlarged head 116 projects laterally relative to the body section 115, which enhances firm engagement of the spike section 111 in the mounting base. An inner side of the spike section 111 of each of the plurality of staples 10 includes a rib 117 extending on the body section 115 and the enlarged head 116, which reinforces the structural strength of the staple 10 and facilitates insertion of the spike section 111 into the mounting base. The two leg portions 11 define a width direction W, and a height direction H is defined as to be perpendicular to the width direction W. The crown portion 12 of each of the plurality of staples 10 has a height D extending in the height direction H larger than a width of the leg portion 11 extending in the width direction W, which reinforces the structural strength of the staple 10 and facilitates insertion of the spike section 111 into the mounting base.

In this embodiment, the plurality of staples 10 are distanced equidistantly by at least one of the first connection portion 20 and the second connection portion 30, preventing the striker of the stapler 50 from striking neighboring two staples of the plurality of staples 10 at once. Preferably, the second connection portion 30 includes at least one of an inner connection portion 31 and an outer connection portion 32 (preferably both), and the inner connection portion 31 and the outer connection portion 32 are connected to inner and outer regions of the leg portion 11 of each of the plurality of staples 10, respectively. Preferably, the second connection portion 30 is connected with at least one of the stop portion 40 and the enlarged head 116. Specifically, the inner connection portion 31 is connected to the stop portion 40, the outer connection portion 32 is connected to the enlarged head 116, and the inner connection portion 31 and the outer connection portion 32 are arranged in a high-low manner relative to the first connection portion 20. The inner connection portion 31 and the outer connection portion 32 can make relative spatial relationship of the plurality of staples 10 stable and precise. Specifically, the stop portion 40 projects in a direction in which the two leg portions 11 face each other and includes a stop end face 118 facing in a direction away from the crown portion 12, the first connection portion 20 is connected with and between upper regions of the crown portions 12 of neighboring two staples of the plurality of staples 10, the second connection portion 30 is connected with and between the stop portions 40 of neighboring two staples of the plurality of staples 10 and connected with and between the enlarged heads 116 of the spike sections 111 of neighboring two staples of the plurality of staples 10, the rib 117 is connected to the stop end face 118, an outer side of each of the plurality of staples 10 further includes two ribs 15 each extending on the crown portion 12 and the two leg portions 11 and partially overlapping in a direction parallel to the rib 117 of the spike section 111, and the second connection portion 30 is connected with and between the enlarged heads 116 of the spike sections 111 of neighboring two staples of the plurality of staples 10 to form a U-shaped structure 119.

Preferably, at least one of two staples of the plurality of staples 10 at two distal ends of the one piece staple strip 1 further includes a spacing member 14, and the spacing member 14 has a thickness is equal to or larger than one half a distance G between neighboring two staples of the plurality of staples 10. In this embodiment, the two staples of the plurality of staples 10 at the two distal ends of the one piece staple strip 1 each includes one spacing member 14 whose thickness is equal to one half a distance G between neighboring two staples of the plurality of staples 10, so that two one piece staple strips 1 in the cartridge 50 can be distanced with the distance G by the spacing members 14 of the two one piece staple strips 1.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A one piece staple strip made of plastic, including:
a plurality of staples, each of the plurality of staples including two leg portions and a crown portion connected with and between the two leg portions;
a connection portion, connected with and between every neighboring two staples of the plurality of staples; and
a stop portion, projecting laterally from the two leg portions of each of the plurality of staples and defining a holding space with the crown portion of each of the plurality of staples, the holding space being configured to receive a cable;
wherein each of the two leg portions of each of the plurality of staples includes a spike section extending from the stop portion;
wherein the stop portion projects in a direction in which the two leg portions face each other and includes a stop end face facing in a direction away from the crown portion;
wherein the spike section of each of the plurality of staples includes a body section extending from the stop portion and an enlarged head connected to the body section, and the enlarged head projects laterally relative to the body section;
wherein the connection portion includes at least one of a first connection portion and a second connection portion, the first connection portion is connected with and between upper regions of the crown portions of neighboring two staples of the plurality of staples, and the second connection portion is connected with and between the stop portions of neighboring two staples of the plurality of staples and connected with and between the enlarged heads of the spike sections of neighboring two staples of the plurality of staples;
wherein an inner side of the spike section of each of the plurality of staples includes a rib connected to the stop end face and extending on the body section and the enlarged head;
wherein an outer side of each of the plurality of staples further includes two ribs each extending on the crown portion and the two leg portions and partially overlapping in a direction parallel to the rib of the spike section.

2. The one piece staple strip of claim 1, wherein the second connection portion is connected with and between the enlarged heads of the spike sections of neighboring two staples of the plurality of staples to form a U-shaped structure, and the plurality of staples are distanced equidistantly by at least one of the first connection portion and the second connection portion.

3. The one piece staple strip of claim 2, wherein the second connection portion includes at least one of an inner connection portion and an outer connection portion, and the inner connection portion and the outer connection portion are connected to inner and outer regions of the two leg portions of each of the plurality of staples, respectively.

4. The one piece staple strip of claim 1, wherein the crown portion of each of the plurality of staples includes a projection at a top side thereof.

5. The one piece staple strip of claim 1, wherein the spike section of each of the plurality of staples includes a tapered end which is a free end.

6. The one piece staple strip of claim 1, wherein the two leg portions define a width direction, a height direction is defined as to be perpendicular to the width direction, and the crown portion of each of the plurality of staples has a height extending in the height direction larger than a width of the two leg portions extending in the width direction.

7. The one piece staple strip of claim 1, wherein the second connection portion is connected with at least one of the stop portion and the enlarged head.

8. The one piece staple strip of claim 7, wherein the plurality of staples are distanced equidistantly by the first connection portion and the second connection portion; the second connection portion includes at least one of an inner connection portion and an outer connection portion, and the inner connection portion and the outer connection portion are connected to inner and outer regions of the two leg portions of each of the plurality of staples, respectively; the inner connection portion is connected to the stop portion, the outer connection portion is connected to the enlarged head; the inner connection portion and the outer connection portion are arranged in a high-low manner relative to the first connection portion; the crown portion of each of the plurality of staples includes a projection at a top side thereof; the spike section of each of the plurality of staples includes a tapered end which is a free end; the tapered end includes an inner inclined face and an outer inclined face, and an extent of the outer inclined face is smaller than an extent of the inner inclined face; the two leg portions define a width direction, a height direction is defined as to be perpendicular to the width direction, and the crown portion of each of the plurality of staples has a height extending in the height direction larger than a width of the two leg portions extending in the width direction; the holding space includes two straight sides opposite to each other, two shoulders, and a concave side; the two shoulders are connected laterally to the two straight sides, respectively; the concave side is connected to an end of one of the two shoulders and an end of an other of the two shoulders; an extending line of the two shoulders divides the holding space into a rectangular region and a segment region.

9. The one piece staple strip of claim 1, wherein at least one of two staples of the plurality of staples at two distal ends of the one piece staple strip further includes a spacing member, and the spacing member has a thickness equal to or larger than one half a distance between neighboring two staples of the plurality of staples.

* * * * *